United States Patent
Hester et al.

(10) Patent No.: US 7,133,373 B2
(45) Date of Patent: Nov. 7, 2006

(54) WIRELESS NETWORK WITH IMPROVED SHARING OF HIGH POWER CONSUMPTION TASKS

(75) Inventors: Lance Hester, Sunrise, FL (US); Oleg Andric, West Palm Beach, FL (US); Jian Huang, Coral Springs, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 130 days.

(21) Appl. No.: 10/741,266

(22) Filed: Dec. 19, 2003

(65) Prior Publication Data

US 2005/0135309 A1 Jun. 23, 2005

(51) Int. Cl.
*G08C 17/00* (2006.01)
*H04Q 7/24* (2006.01)
*H04L 12/28* (2006.01)

(52) U.S. Cl. .................. 370/311; 370/338; 370/401

(58) Field of Classification Search .............. None
See application file for complete search history.

(56) References Cited

U.S. PATENT DOCUMENTS

| | | | |
|---|---|---|---|
| 6,711,409 B1 * | 3/2004 | Zavgren, Jr. et al. | 455/445 |
| 6,795,407 B1 * | 9/2004 | Chesson | 370/311 |
| 6,894,991 B1 * | 5/2005 | Ayyagari et al. | 370/325 |
| 2001/0001912 A1 * | 5/2001 | Weaver | 42/94 |
| 2001/0002912 A1 * | 6/2001 | Tony et al. | 370/487 |
| 2002/0126627 A1 | 9/2002 | Shi et al. | |
| 2002/0150145 A1 * | 10/2002 | Alriksson et al. | 375/132 |
| 2002/0169846 A1 | 11/2002 | Chen et al. | |
| 2004/0029553 A1 * | 2/2004 | Cain | 455/403 |

OTHER PUBLICATIONS

Michail, Anastassios et al, "Algorithms For Routing Session Traffic In Wireless Ad-Hoc Networks With Energy And Bandwidth Limitations," 12th IEEE International Symposium on Personal, Indoor and Mobile Radio Communications, pp. F-67-F-71 vol. 2, 2001.
Yarvis, Mark D., "Real-World Experiences With An Interactive Ad Hoc Sensor Network", 2002 International Conference on Parallel Processing Workshops (ICPPW'02) Aug. 18-21, 2002 Vancouver, B.C., Canada.
Lal, Dhananjay et al, Measurements and Characterization of Link Quality Metrics in Energy Constrained Wireless Sensor Newtorks, Globecom 2003.
Skraba, P. , Adaptive Routing for Ad-Hoc Wireless Networks Based On Channel Conditions, Jun. 9, 2003.
Jing, X., Energy-efficient Routing Protocols in Wireless Ad Hoc Networks, Department Electrical Engineering College of City University of New York, Spring 2001.

* cited by examiner

*Primary Examiner*—Chau Nguyen
*Assistant Examiner*—Cynthia L. Davis
(74) *Attorney, Agent, or Firm*—Philip A. Premysler; Sylvia Chen

(57) ABSTRACT

Protocols for ad-hoc wireless networks (200) that use mediation devices (202–210) to facilitate communication between low power, low duty cycle wireless devices (212–226) are provided. In order to avoid premature battery exhaustion in particular devices, devices operating as mediation devices (202–210) report their communication load to low duty cycle wireless devices (212–226) that are positioned to be able to use the mediation devices (202–210). Based on the information as to communication load received from multiple mediation devices (202–210), and optionally on a virtual hop count that is a predictor of how rapidly the use of a route through a particular mediation device will lead to battery exhaustion, low duty cycle wireless devices (212–226) choose a mediation device (202–210) to use or proportion use of mediation devices (202–210) in order to delay battery exhaustion in the network.

23 Claims, 8 Drawing Sheets

WIRELESS NETWORK WITH IMPROVED SHARING OF HIGH POWER CONSUMPTION TASKS

CROSS REFERENCE TO RELATED APPLICATIONS

This application is related to the following co-pending applications "Media Access Control and Distributed Data Processing Using Mediation Devices in an Asynchronous Network" Ser. No. 10/443,428, filed May 29, 2003; "A Multiple Access Protocol and Structure for Communication Devices in an Asynchronous Network" Ser. No. 09/803,322, filed Mar. 9, 2001; and "Quality of Service (QoS) Control Mechanisms using Mediation Devices in an Asynchronous Network" Ser. No. 10/443,424, filed May 29, 2003, which are assigned to the assignee of the present application and hereby incorporated herein by reference.

FIELD OF THE INVENTION

The present invention relates in general to networking. More particularly, the present invention relates to wireless networking.

BACKGROUND OF THE INVENTION

Advances in electronics manufacturing technology have enabled the manufacture of inexpensive wireless devices in large quantities. Presently, there is an interest in greatly expanding the use of wireless networks beyond traditional communication uses.

It is expected that in the future wireless networks will be used for a variety of sensing, control, security, and location based services. The design of devices and protocols for operation of networks for such applications present numerous challenges. It is expected that in many such networks it will be necessary or desirable to have devices that can operate for extended periods of time on battery power. In the interest of reducing the cost of devices for such networks so that they can be widely deployed, it is believed that high accuracy, high cost crystal oscillators traditionally used in wireless communication devices may have to be dispensed with in favor of lower cost albeit lower accuracy components. Limiting the operating power reduces the amount of signaling and signal processing that can be used in maintaining and using a network. Using lower accuracy oscillators limits the ability of devices in a wireless network to stay in synchronization. Operating with low power tends to dictate infrequent signaling and reception, whereas use of low accuracy oscillators (which perforce leads to inter-device timing errors) makes it difficult to achieve coincidence of one device's infrequent signaling with another device's infrequent reception.

To address the foregoing difficulties co-pending patent application Ser. No. 09/803,322, entitled "A Multiple Access Protocol and Structure for Communication Devices in an Asynchronous Network" which is assigned in common with the instant application proposes a protocol according to which a number of devices in a network are able to operate with very low duty cycles. In low duty cycle operation, devices actively receive and transmit for relatively short periods compared to longer periods in which the devices are in a low powered sleep mode. Operating according to a low duty cycle leads to reduced power consumption, which as stated above is desirable or required for certain applications. Although such devices may have low accuracy oscillators, they are able to communicate through a number of devices that act as mediation devices. The mediation devices operate at a higher duty cycle than the other devices, and have relatively long receive periods during which they are able to receive communication from the low duty cycle devices. A low duty cycle device wanting to send a message (e.g., to another low duty cycle device) sends a 'communication request' message to a mediation device. Low duty cycle devices also periodically send 'query' messages to the mediation device to ascertain if they are the intended recipients of communications from other low duty cycle devices. The mediation devices receive and store the communication request messages, and upon receiving a query message from an intended recipient indicated in a communication request message, send a 'response' message to the querying device. The response message includes timing information for the device that initiated communication to the querying device by sending the communication request. The timing information allows the querying device to adjust its own timing to synchronize with the device that initiated communication, and thereafter directly (without going through the mediation device) communicate with the device that initiated communication.

Unfortunately, devices operating as mediation devices tend to consume more power. However, co-pending patent application Ser. No. 09/803,322 also discloses protocols in which devices in a network share the task of operating as mediation devices. In the latter case, the extra power consumption burden associated with operating as a mediation device will be shared among devices in a network.

Co-pending patent application Ser. No. 10/443,428 entitled "Media Access Control and Distributed Data Processing Using Mediation Devices in an Asynchronous Network" discloses protocols in which the aforementioned mediation devices take on additional functions including storing and forwarding data.

The protocols described in the abovementioned co-pending applications are suitable for so-called "ad-hoc" networks. In forming ad-hoc networks, a number of devices are placed in a building or outdoors so that subsets of the devices are within radio communication range of each other. The devices then interoperate to form a connected network. The placement of the devices may be dictated by application dependent needs, (e.g., a device may need to be placed at each smoke detector in a fire alarm application) and is not necessarily ideal from a network design point of view. The topology of such ad-hoc networks, which is in part dictated by the network formation protocol that is used and in part by the locations of the devices (dictated by application, and beyond the control of the protocol designer) can, in the case of protocols using mediation devices, lead to some of the mediation devices handling a greater communication load burden. Devices handling a greater communication load burden may, in the case of battery powered operation, exhaust their batteries first, and impair or disable the network, even if the batteries of most devices still have a substantial amount of energy remaining. Furthermore forcing a particular mediation device to bear a greater communication load could, for certain protocols and for heavy network traffic conditions, lead to increased message latency.

What is needed is a protocol for ad-hoc networks using mediation devices that facilitates sharing the burden of communication tasks that expend power and/or communication bandwidth.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
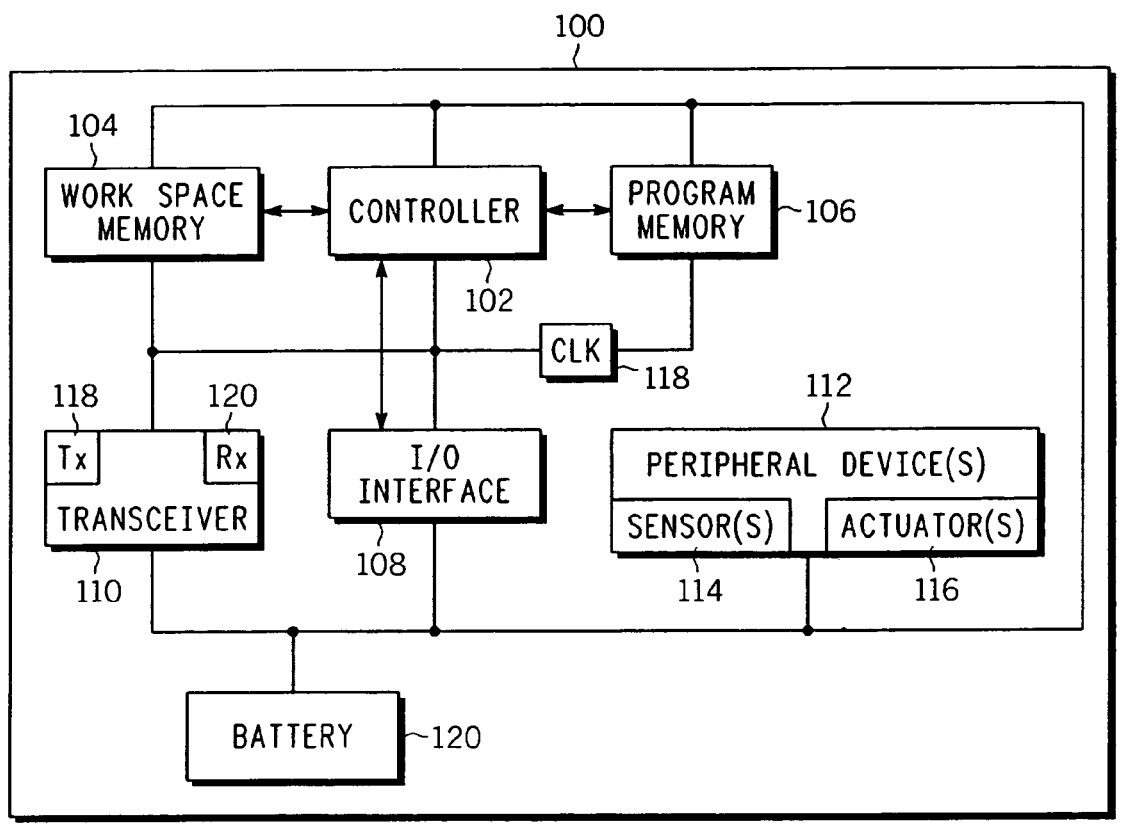
FIG. 1 is an electrical schematic, in block diagram form, of an embodiment of a wireless device.

FIG. 1 is an electrical schematic, in block diagram form, of an embodiment of a wireless device 100. The wireless device 100 includes a controller 102. A workspace memory 104, a program memory 106 and an Input/Output (I/O) interface 108 are coupled to the controller 102. The workspace memory 104 and the program memory 106 can be embodied in a single physical memory.

The program memory 106 stores a control program for the wireless device 100. The program memory 106 is a form of computer readable media. The control program configures the wireless device 100 to operate as described below with reference to FIGS. 3–10. Program instructions of the control program are received by the controller 102, from the program memory 106. Digital signals and data pass between the transceiver 110, and the controller 102 in the course of operation of the wireless device 100.

The I/O interface 108 is coupled to transceiver 110, and to one or more peripheral devices 112. As indicated in FIG. 1, the one or more peripheral devices 112 comprise one or more sensors 114, and one or more actuators 116. For certain applications the sensors 114, and/or the actuators 116 can be eliminated. For example for portable equipment location tracking applications neither the sensors 114, or actuators 116 are needed. For sensor network applications, only the sensors 114 are needed. The transceiver 110 comprises a transmitter 118, and a receiver 120.

A clock module 118 is coupled to the controller 102, the program memory 106, the work space memory 104, the I/O interface 108, and the transceiver 110. The clock module provides timing signals for operating the various components. The clock module is suitably based on a Micro Electromechanical System (MEMS) resonator device that is built into a semiconductor die that also includes one or more electrical circuits of the wireless device 100. MEMS resonators have the potential to be less expensive than traditional quartz oscillators; however, they may be less accurate and cause the difficulties discussed above.

A battery 120 is coupled to the controller 102, the workspace memory 104, the program memory 106, the I/O interface 108, the transceiver 110, and the peripheral devices 112.

In the interest of economy, multiple parts of the wireless device are suitably integrated in a single die. The wireless device 100 is suitable for use in ad-hoc networking.

Figure 2:
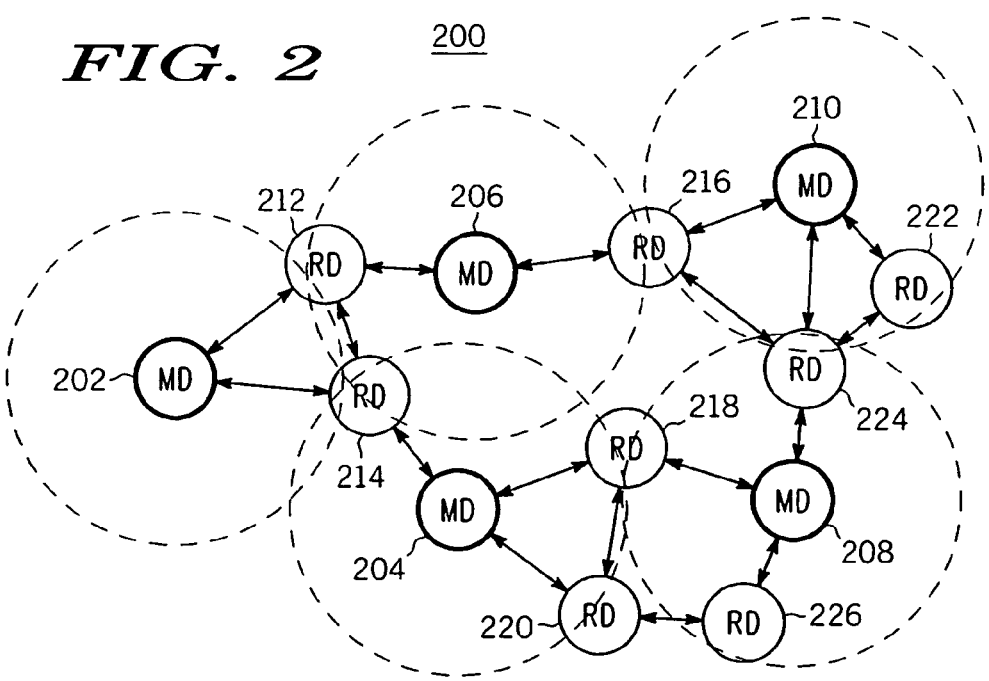
FIG. 2 is a graph of a network that includes devices of the type shown in FIG. 1 functioning in two modes.

FIG. 2 is a graph of a network 200 that includes wireless devices of the type shown in FIG. 1 functioning in two modes. The network 200 comprises a plurality of wireless devices including a first through a fifth device operating in mediation device mode 202–210 (hereinafter referred to as mediation devices), and a first through an eighth device 212–226 operating in regular (non-mediation) device mode (hereinafter referred to as regular devices). Co-pending patent application Ser. No. 09/803,322 discloses methods whereby devices share the task of operating in mediation device mode. Programs stored in the program memory allow the wireless devices 202–226 to operate in both modes. As shown in FIG. 2 the mediation devices 202–210 are interspersed among the regular devices 212–226, such that regular devices 212–226 are generally in communication range of mediation devices 202–210 and are able to communicate with the support of mediation devices 202–210.

Figure 3:
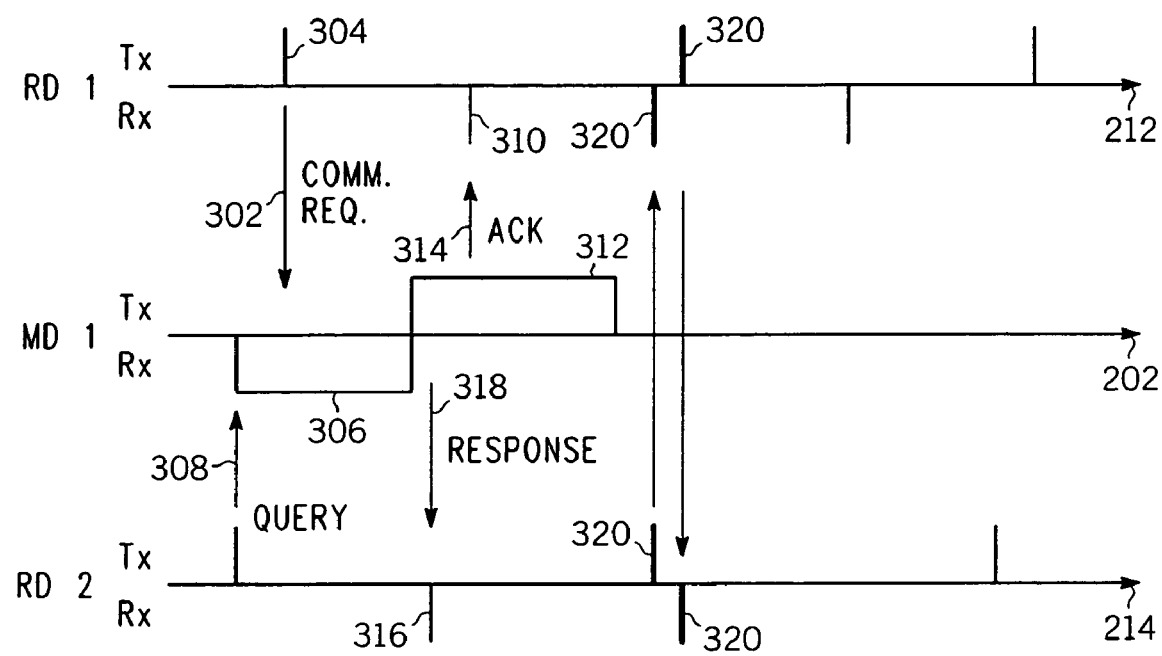
FIG. 3 is a timing diagram illustrating functioning of mediation devices in the network illustrated in FIG. 2 in order to coordinate communications among initially unsynchronized devices.

FIG. 3 is a timing diagram illustrating functioning of the mediation devices 202–210 in the network 200 illustrated in FIG. 2 in order to coordinate communications among initially unsynchronized devices. Although the operation illustrated in FIG. 3 is taught in co-pending patent application Ser. No. 09/803,322, entitled "A Multiple Access Protocol and Structure for Communication Devices in an Asynchronous Network", a description is given here by way of introduction to additional methods taught below.

Timelines showing communications by the first mediation device 202 and the first 212 the second 214 regular devices are shown in FIG. 3. In the timelines shown in FIGS. 3–4, periods of transmission appear above each time axis, and periods of reception appear below each time axis. Note that the first mediation device 202 is in range of both the first 212 and second 214 regular devices, and the first 212 and second 214 regular devices are in range of each other. However, the first 212 and second 214 regular devices operate at a low duty cycle, and due to clock drift are generally not synchronized with each other (i.e. a receive slot of one does not overlap a transmit slot of the other). In order to initiate communication with the second regular device 214, the first regular device 212 transmits a communication request 302 to the first mediation device 202. The communication request 302 is sent during a relatively short transmit slot 304 for the first regular device 212 and received during a longer receive frame 306 of the first mediation device. The communication request 302 identifies the second regular device 214 (e.g., by address) as the destination for messages to be sent. Note that prior to receiving the communication request 302 from the first regular device 212, the mediation device 202 received a query message 308 from the second regular device 214. Query messages are suitably issued periodically e.g., once every frame interval. The query message 308 is sent by the second regular device 214 to ascertain if any other device seeks to communicate with the second regular device. In receiving the communication request 302, and the query message 308, the first mediation device 202 learns the timing of communications by first 212 and second 214 regular devices. In as much as the first 212 and second 214 regular devices receive and transmit periodically during, at least, certain periods, the mediation device 202 is able to calculate when the regular devices 212, 214 will again be in receive mode. During a subsequent receive slot 310 of the first regular device 212 that overlaps a transmit frame 312 of the first mediation device 202, the first mediation device 202 sends an acknowledgment message (ACK) 314 to the first mediation device 202 acknowledging receipt of the communication request 302. During a receive slot 316 of the second regular device 214 (at a time subsequent to transmitting the query 308) and also overlapping the transmit frame 312 of the mediation device 202, the first mediation device 202 sends a response 318 to the second regular device 214. The response 318 includes information indicative of a timing adjustment to be made to a schedule of the second regular device 214 to allow the second regular device 214 to synchronize with the first regular device 212. Thereafter, the second regular device 214 adjusts its schedule for subsequent time slots 320, and the first 212 and second 214 regular devices are able to communicate with each other directly. As illustrated with reference to FIG. 3 the mediation devices 202–210 are able to facilitate direct communication between regular devices 212–226 by coordinating the synchronization of regular devices 212–226.

Figure 4:
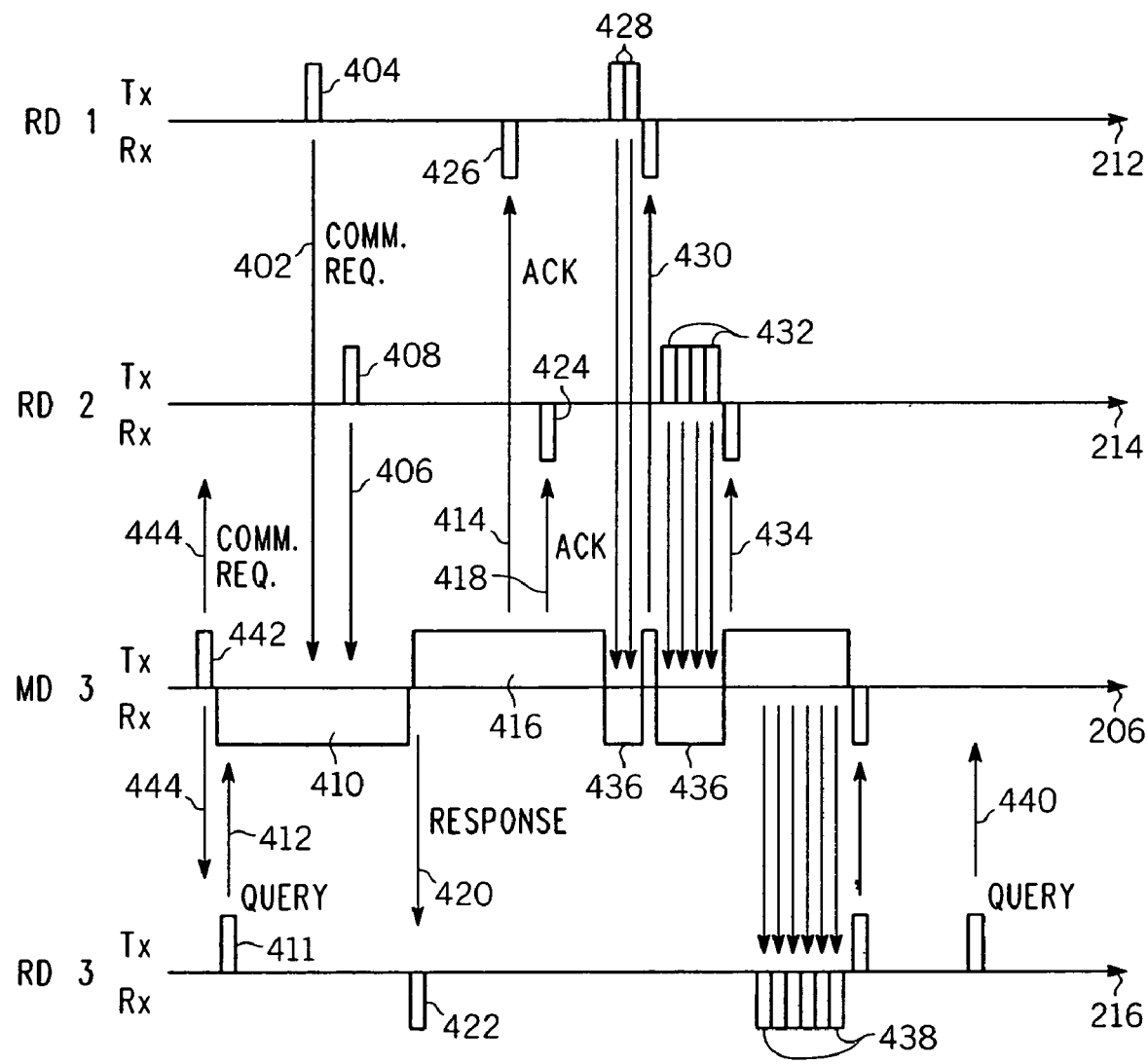
FIG. 4 is a timing diagram illustrating functioning of mediation devices in the network illustrated in FIG. 2 in order to store and forward messages in the network.

FIG. 4 is a timing diagram illustrating functioning of mediation devices 202–210 in the network 200 shown in FIG. 2 in order to store and forward messages. In the particular scenario depicted in FIG. 4, both the first 212 and second 214 regular devices transmit data through the third mediation device 206 to the third regular device 216. At other times during the operation of the network 200, only one regular device, or more than two regular devices may transmit data through a mediation device. Although in the scenario illustrated in FIG. 4 both the first 212 and 214 regular devices transmit message via the third mediation device 206 to a single regular device, i.e. the third regular device 216, at other times during the operation of the network 200, messages may be passed through a mediation device to multiple regular devices.

Referring to FIG. 4, the first regular device 212 initiates communication by sending a first communication request 402, during a first transmit slot 404 of the first regular device 212. Similarly, the second regular device 214 initiates communication by sending a second communication request 406 during a first transmission slot 408 of the second regular device 214. Each of the communication requests 402, 406 includes an indication of the length of a multipart message that is to be transmitted. For example, a binary field in a header of the communication requests 402, 406 suitably includes a total number of message parts for multipart messages initiated with the communication requests 402, 406. Each of the communication requests also identifies a destination to which messages are to be sent. In the scenario illustrated in FIG. 4, the communication requests from the first 212 and second 214 regular devices identify the third regular device 216 as the intended destination. The communication requests 402, 406 are received during a first receive frame 410 of the third mediation device 206. The first receive frame 410 is long compared to the duration of the communication requests 402, 406, in order to increase the chance that the communication requests 402, 406 will be received notwithstanding drifts in operating schedules of the devices 202–226 in the network stemming from the use of low cost, reduced accuracy clocks.

The third regular device 216 sends a query message 412 to the third mediation device 206 during a transmit slot 411 of the third regular device 216, in order to ascertain if another device in the network 200 has sent a communication request to third mediation device 206 that identified the third regular device 216 as an intended destination for communication. The query 412 is also received during the first receive frame 410 of the third mediation device 206. Although, in the scenario illustrated in FIG. 4, the query 412 is received prior to both the communication requests 402, 406, this need not be the case.

In response to receiving the communication request 402 from the first regular device 212, the third mediation device 206 sends a first acknowledgment message 414 to the first regular device 212 during a first transmit frame 416 for the third mediation device 206. Similarly, the third mediation device 206 sends a second acknowledgement 418 to the second regular device 214, during the first transmit frame 416, in response to receiving the communication request 406 from the second regular device 214. The third mediation device 206 also sends a response message 420 to the third regular device 216. The response message 420 is timed to a relatively short duration receive slot 422 of the third regular device 216. The response message 420 commands the third regular device 216 to operate in receive mode during a specified period 438, in order to receive the multipart messages that are to be sent by the first 212 and second 214 regular devices via the third mediation device 206.

The third mediation device 206 times the acknowledgment messages 414, 418 and the response message 420 to coincide with short duration receive slots 422, 424, 426 of the regular devices 216, 214, 212 by adding known (or communicated) intercommunication intervals for the regular devices 212, 214, 216 to times at which the communication requests 402, 406 and the query 412 were received by the third mediation device 206. The acknowledgement messages 414, 418 indicate to the first 212 and second 214 regular devices when to transmit remaining parts of the multipart messages initiated with the communication requests 402, 406.

Subsequently, during a first series of time slots 428 commencing at a time indicated in the first acknowledgement 414, the first regular device 212 transmits remaining parts of the multipart message initiated in the first communication request 402. In response to receiving the remaining parts of the multipart message, a third acknowledgement message 430 is transmitted from the third mediation device 206 to the first regular device 212. During a second series of slots 432 commencing at a time indicated in the second acknowledgement 418, the second regular device 214 transmits remaining parts of the multipart message that was initiated with the second communication request 406. In response thereto, the third mediation device 206 sends a fourth acknowledgement message 434 to the second regular device 214. The first 428 and second 432 series of time slots overlap receive periods 436 of the third mediation device 206.

Parts of the multipart messages received by the third mediation device 206 during receive periods 436 are stored in a queue prior to retransmission. The queue is suitably established in the workspace memory 104 of the third mediation device 206. A measure of the size of the queue built up during receive periods 436 of the mediation devices 202–210 is also stored in the mediation devices 202–210. A running average of the queue size over multiple receive periods is suitably used in order to filter out brief atypical excursions in the queue size. The queue size or average queue size of a particular mediation device indicates the communication load of the particular mediation device, and is closely related to the rate of battery depletion for the particular mediation device. As described further below, the queue size, average queue size, and/or other measures of communication load on the mediation devices 202–210 are used in selecting mediation devices in order to avoid battery exhaustion which might impair or disable the network 200.

Referring again to FIG. 4, during the period 438 specified to the third regular device 216 by the third mediation device 206 in the response 420, the third mediation device 206 transmits the multipart messages that were received from the first 212 and second 214 regular devices and stored in the queue, to the third regular device 216. Thus, as shown in FIG. 4 mediation devices in the network 200 are able to relay messages between devices operating in regular device mode.

Referring to FIG. 2, it is apparent that the first 212 and second 214 regular devices are within range of the first mediation device 202 and the third mediation device 206. The first 212 and second 214 regular devices are thus able to use either the first mediation device 202, or the third mediation device 206 to synchronize as illustrated in FIG. 3 or relay messages as illustrated in FIG. 4. A choice of mediation device can be effected by specifying an address of a particular mediation device in transmitted packets, and by transmitting during a receive period of a particular mediation device. (Because mediation devices operate at a higher duty cycle than regular devices, clock drift will be less of an impediment to synchronizing messages sent to a particular mediation device within the particular mediation device's receive period. This is the case even after a relatively long duration has passed since a previous communication with a particular mediation device which had afforded the opportunity to discover the timing of periodic reception frames of the particular mediation device.) Choosing a particular mediation device causes the particular mediation device 202–210 to expend energy. Mediation devices 202–210 will typically consume more power than regular devices. Overburdening a particular device will lead to battery exhaustion in the particular device, which in turn may impair or disable the network 200. FIGS. 5–6, 9–10 include flowcharts of operations performed by the wireless devices 202–226 in the network 200 in order to better distribute the burden on mediation devices.

Referring again to FIG. 4, note that after receiving the multipart messages, the third regular device 216 transmits additional query messages, represented by a single query message 440, in order to ascertain whether additional messages are to be sent to the third regular device 216. Each additional query message may not coincide with a receive period of third mediation device 206, but may coincide with a receive period of another mediation device in the network 200. Although not shown in FIG. 4, if the first 212 and second 214 regular devices need to relay messages through a mediation device at a later time, they will send additional communication requests.

Prior to the first receive frame 410 of the third mediation device 206 there is a short transmit slot 442. During the short transmit period 442 one or more announcement messages 444 that suitably include indications of communication load on the third mediation device 206 are transmitted. Use of the indications of communication load is discussed further with reference to FIGS. 5–7.

Figure 5:
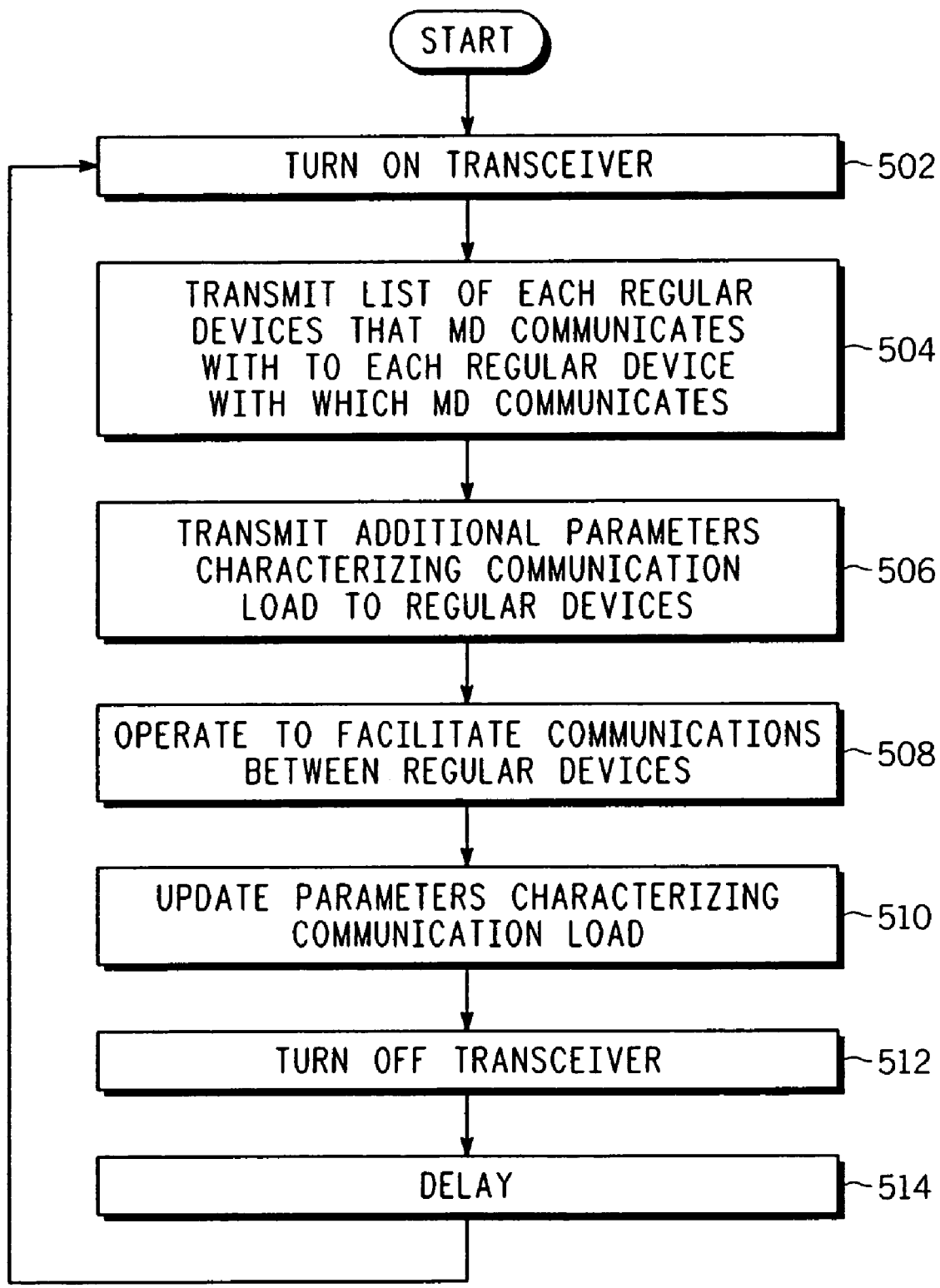
FIG. 5 is a flowchart showing operations performed by each mediation device in the network shown in FIG. 2 in maintaining current communication load information and transmitting such information to neighboring regular devices.

FIG. 5 is a flowchart showing operations performed by each mediation device 202–210 in the network shown in FIG. 2 in maintaining current communication load information and transmitting such information to neighboring regular devices. The operations shown in FIG. 5 are part of network maintenance activities that take place on a schedule or in response to changes in the network 200. In block 502, a mediation device executing programs that embody the flowchart turns on its transceiver 110. In block 504, the mediation device transmits a list of each regular device that the mediation device communicates with to each regular device with which the mediation device communicates. (A particular regular device need not be included in the list it receives from the mediation device, as its inclusion is implicit.) The number of regular devices that a mediation device communicates with is useful as a characterization of the communication load on the mediation device. (Although a simple count would suffice as a characterization of communication load, a list is useful for message routing in that it allows regular devices to determine which other regular devices can be reached through a particular mediation device.)

In block 506, additional parameters characterizing the communication load on the mediation device are transmitted to regular devices that the mediation device communicates with. Examples of additional parameters that characterize the communication load include: queue length, average queue length, average acknowledgement time, number of outstanding messages to be transmitted, etc. The transmissions of blocks 504, 506 suitably occur during short transmit periods (e.g., period 442) of the mediation device, as described further below with reference to FIG. 7. However the transmissions of blocks 504, 506 alternatively take place at other times, as for example, described below with reference to FIG. 8.

Block 508 represents operation of the mediation device to facilitate communication between regular devices in the network 200, as described with reference to FIGS. 3–4, and taught in co-pending applications Ser. No. 09/803,322, Ser. No. 10/443,424 and Ser. No. 10/443,428.

In block 510, the mediation device updates the parameters characterizing the communication load. In the case of queue length, the queue length is updated to reflect the size to which the queue grew during operation of the mediation device to facilitate communication in block 508. In the case that a running average of the queue length is used to characterize communication load, the running average is recomputed based on the queue length attained during the preceding execution of block 508.

In block 512, the transceiver turns off to conserve battery power, and then after a delay 514 the mediation device loops back to block 502, to begin the foregoing operations again. It will be apparent to those skilled in the art that the order of the blocks shown in FIG. 5 can be varied.

By executing the operations shown in FIG. 5, each particular mediation device 202–210 in the network 200 informs regular devices that are served by the particular mediation device of the communication load on the particular mediation device. As described below with reference to FIGS. 6, 9–10, regular devices use information regarding the communication load on mediation devices in determining which mediation device or devices to use in order to avoid, to an extent, overburdening particular mediation devices.

Figure 6:
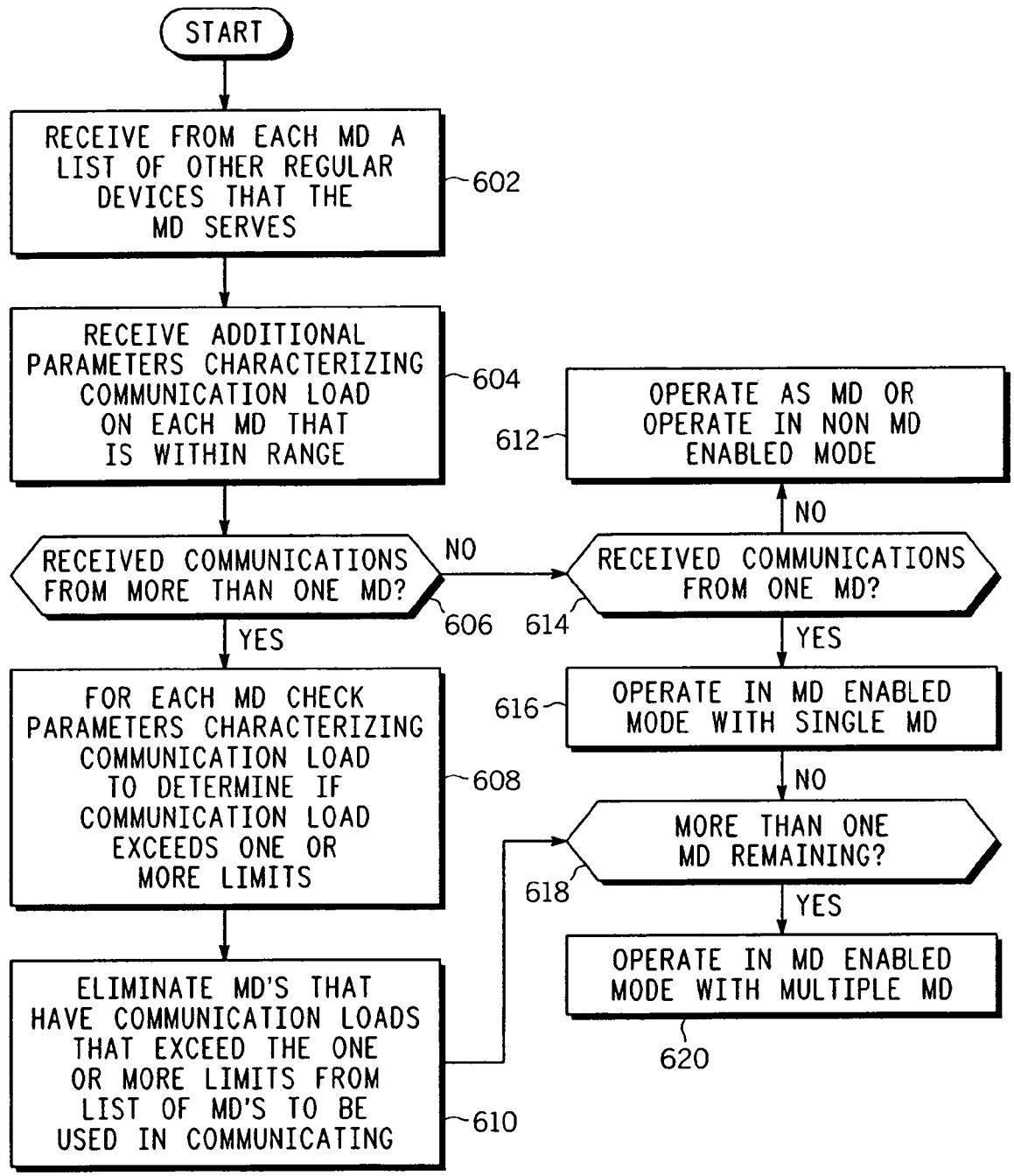
FIG. 6 is a flowchart showing operations performed by regular devices in the network shown in FIG. 2 in determining the availability of mediation devices.

FIG. 6 is a flowchart showing operations performed by regular devices in the network 200 shown in FIG. 2 in determining the availability of mediation devices. In block 602, a regular device receives from each particular mediation device within range a list of other regular devices that the particular mediation device serves. The information received in block 602 is the information sent in block 504 of the flowchart shown in FIG. 5.

In block 604, the regular device receives additional parameters that characterize the communication load on one or more mediation devices within range of the regular device. The information received in block 604 is the information sent in block 506 of the flowchart shown in FIG. 5.

Note that execution of blocks 602–604 can involve receiving during a plurality of separate receive periods for each of a plurality of mediation devices.

Referring again to FIG. 6, block 606 is a decision block the outcome of which depends on whether communications are received from more than one mediation device, i.e. if more than one active mediation device is within range of the regular device executing the flowchart shown in FIG. 6. If communications are not received from more than one mediation device, then the flowchart continues with decision block 614, the outcome of which depends on whether communications are received from at least one mediation device. If communications were not received from even one mediation device, then the flowchart branches to block 612 in which the device executing the flowchart commences operation in mediation device mode. Alternatively, in the case that communications are not received from any mediation device, the regular device executing the flowchart shown in FIG. 6 commences operation in a mode that does not use mediation devices. A suitable mode that does not rely on mediation devices is carrier sense multi access (CSMA).

If in decision block 614 it is determined that communications were received from a single mediation device, then in block 616 the regular device executing the flowchart shown in FIG. 6 commences to operate in a single mediation device enabled mode. Use of a mediation device is described above with reference to FIGS. 3–4, and taught in co-pending applications Ser. No. 09/803,322, Ser. No. 10/443,424 and Ser. No. 10/443,428.

If decision block 606 determines that communications were received from more than one mediation device, then the flowchart continues with block 608 in which, for each particular mediation device from which communications were received, the parameters that characterize the communication load on the particular mediation device are checked to determine if the communication load on the particular mediation device exceeds one or more predetermined limits. Each parameter that characterizes communication load can be checked separately against a separate predetermined limit, and/or two or more of the parameters can be combined into a single measure that is checked against a predetermined limit. In the case that queue length or average queue length is used as indication of communication load, the queue length or average queue length is checked against an upper limit. Similarly, in the case that average acknowledgement time is used as an indication of communication load, the average acknowledgement time is checked against an upper limit. In using the number of devices that a mediation device communicates with as an indication of communication load, the number of devices that the mediation devices communicates with is compared to an upper limit. One suitable way by which a plurality of parameters that are indicative of communication load are combined is by taking a weighted sum of the parameters. The weighted sum is then compared to a limit. The upper limits used in block 608 are chosen in order to mitigate the problem of premature battery exhaustion due to mediation device overloading. The exact value of the upper limit is suitably determined after routine experimentation or network simulation.

In block 610, mediation devices that have communication loads that exceed the one or more limits checked in block 608 are eliminated from a list of mediation devices to be used for communicating by the regular device executing the flowchart. By having the regular device that is executing the flowchart not use devices that are found to have communication loads that exceed one or more limits, it is possible to avoid further overburdening of particular mediation devices.

Block 618, which follows block 610, is a decision block, the outcome of which depends on whether more than one mediation device remains after executing block 610. If more than one mediation device remains after executing block 610 then the flowchart continues with block 616 described above. Even if all mediation devices from which communications were received have communication loads that exceed the limits checked in block 608, one mediation device, suitably a mediation device with the least communication load is used in block 616 by the regular device executing the flowchart.

If, in the alternative more than one mediation device remains after eliminating mediation devices in block 610, then in block 620 the regular device executing the flowchart operates in a mediation device enabled mode with more than one mediation device. Use of multiple mediation devices, including the selection of mediation devices in order to avoid overloading particular mediation devices is discussed further below with reference to FIGS. 9–10.

Figure 7:
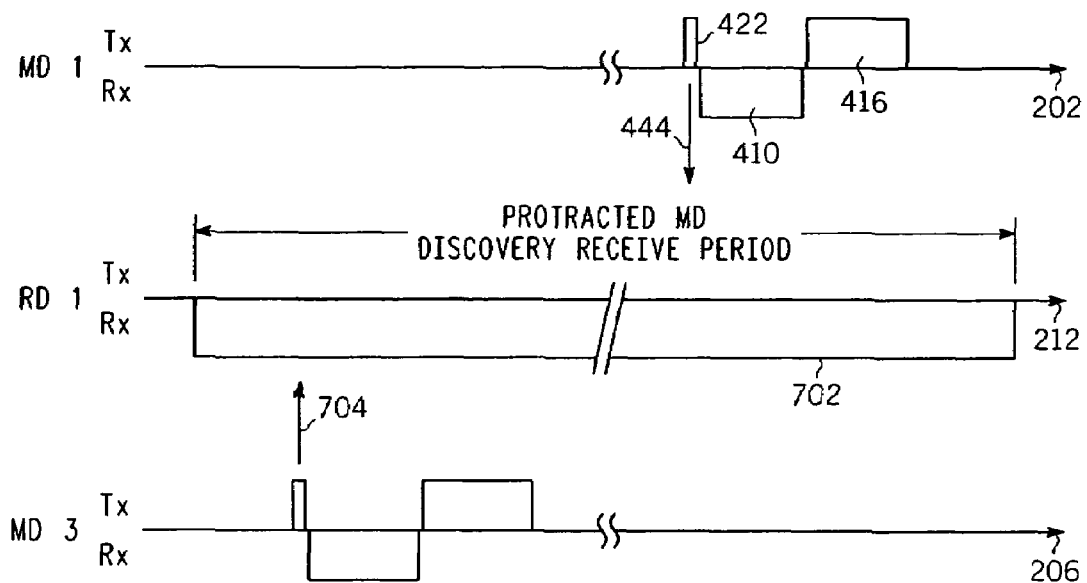
FIG. 7 is a timing diagram illustrating a first method by which mediation devices are detected.
Figure 8:
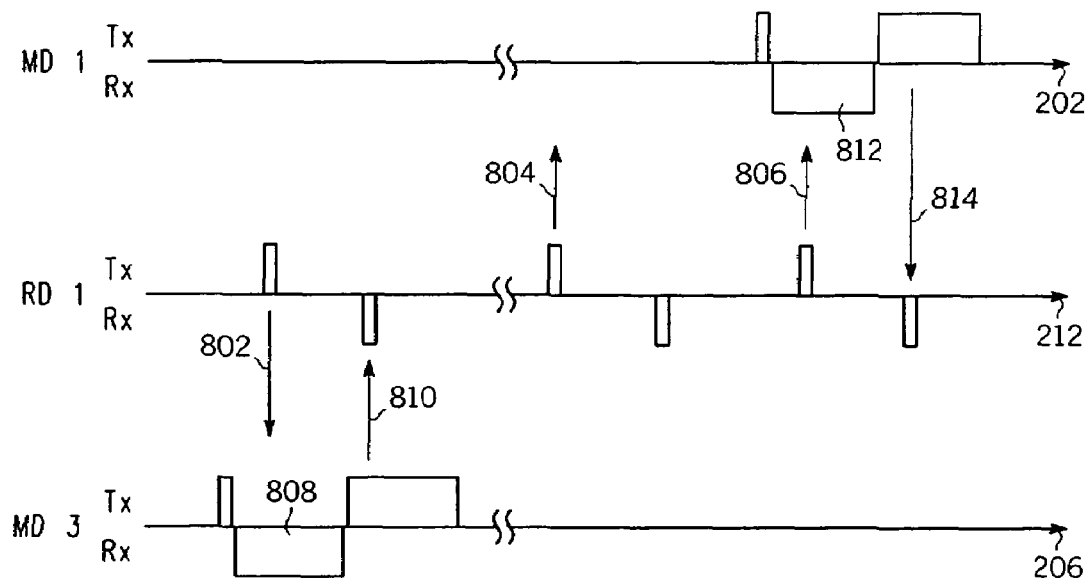
FIG. 8 is a timing diagram illustrating a second method by which mediation devices are discovered.

FIGS. 7–8 are timing diagrams illustrating processes by which regular devices detect mediation devices in their vicinity. One suitable time for the mediation devices to communicate parameters characterizing their communication load is when the mediation devices are detected by regular devices. FIG. 7 is a timing diagram illustrating a first method by which mediation devices are detected. As indicated by reference numerals, FIG. 7 includes time lines for the first mediation device 202, the third mediation device 206, and the first regular device 212. The first regular device is within range of both the first 202 and the third 206 mediation devices, and by the process illustrated in FIG. 7 detects both mediation devices 202, 206. As illustrated in FIG. 7, in order to detect mediation devices that are within range of the first regular device 212, the first regular device 212 operates in receive mode for an extended period of time 702. The extended period of time 702 is suitably equal to a complete cycle time of the mediation devices 202–210. Each cycle time of the mediation devices 202–210 includes a period of active communication 442, 410, 416 and a longer inactive period. During the extended period of time 702, the first regular device 212 receives the announcement 444 from the first mediation device 202, and an announcement message 704 from the third mediation device 206. The announcement messages 444, 704 suitably contain parameters indicative of the communication load on the first 202 and third 206 mediation devices.

Alternatively, announcement messages do not include parameters indicative of communication load, rather such parameters are sent after the announcement messages in response to a request for the parameters from a regular device that has been alerted to the presence of a mediation device by the mediation device's announcement message.

FIG. 8 is a timing diagram illustrating a second method by which mediation devices are detected. In the method illustrated in FIG. 8, in order to detect mediation devices that are within range, each regular device, here exemplified by the first regular device 212, will go into a mode of operation in which the regular device will periodically send out a mediation device discovery message. After sending out each mediation device discovery message, each regular device waits for a predetermined period and then briefly operates in receive mode in order to receive responses to the mediation device discovery message. In FIG. 8, three mediation device discovery messages 802, 804, 806 are shown. The first mediation device discovery message 802 happens to be transmitted within a receive frame 808 of the third mediation device 206. In response to the first mediation device discovery message 802, the third mediation device 206 transmits a first mediation device identification message 810. The second mediation device discovery message 804 is transmitted at a time when there is no mediation device within range of the first regular device 212 operating in receive mode. Consequently, the second mediation device discovery message 804 goes unanswered. The third mediation device discovery message 806 is transmitted within a receive frame 812 of the first mediation device 202, and is received by the first mediation device 202. In response to receiving the third mediation device discovery message 806, the first mediation device transmits a second mediation device identification message 814. Information indicative of the communication loads on the first 202 and third 206 mediation devices is suitably included in the first 810 and second 814 mediation device identification messages.

Alternatively, identification messages do not include information indicative of communication load, rather information indicative of communication load is transmitted in subsequent messages in response to requests from regular devices, which have learned of mediation devices in their vicinity by receiving mediation device identification messages.

The information indicative of communication load of mediation devices that is suitably conveyed in the processes illustrated in FIGS. 7–8, optionally includes the list of regular devices that a mediation device serves, and the additional parameters characterizing communication load that are received in blocks 602–604 of the flowchart shown in FIG. 6.

Figure 9:
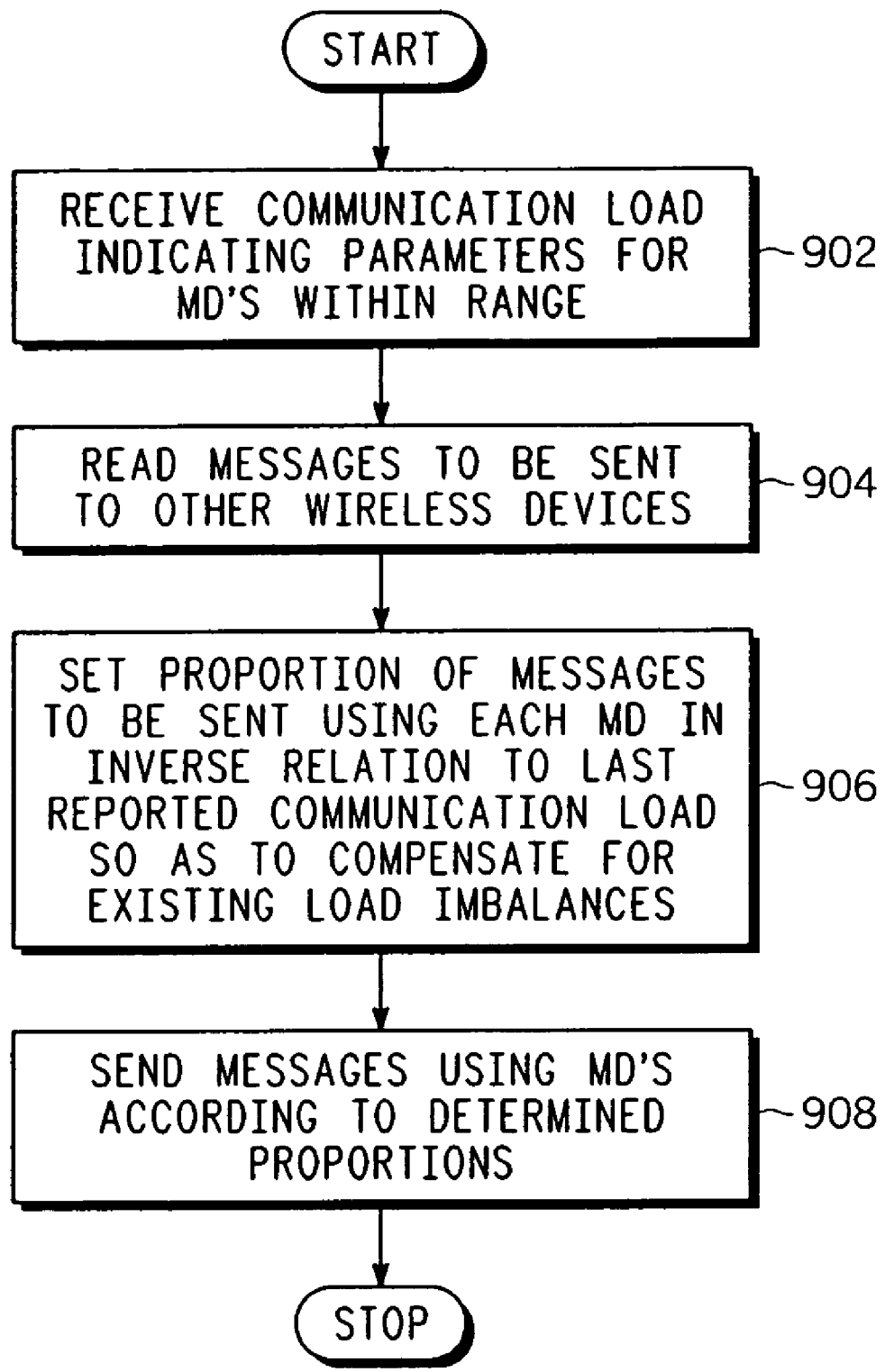
FIG. 9 is a flowchart showing operations performed by a regular device in the network shown in FIG. 2, in proportioning use of multiple, in-range mediation devices.

FIG. 9 is a flowchart showing operations performed by a regular device in the network 200 shown in FIG. 2, in proportioning the use of multiple, in-range mediation devices. The operations shown in FIG. 9 can be conducted after executing the operations shown in FIG. 6, or, alternatively, without executing the operations shown in FIG. 6.

Referring to FIG. 9, in block 902 the regular device receives parameters that indicate the communication load on a plurality of mediation devices. In the case that the operations shown in FIG. 9 are performed after executing the operations shown in FIG. 6, then block 902 is redundant with blocks 602, 604 and need not be included. In block 904, messages including data to be sent to other wireless devices is read. The messages can be received from another wireless device or internally generated. In block 906, a proportion of messages (or parts of a multipart message) to be sent using each particular mediation device that is in range of the regular device executing the flowchart in FIG. 9, is set to an amount that is inversely related to a communication load on the particular mediation device. Thus, mediation devices that have reported high communication loads will be used less, and mediation devices that have reported low communication loads will be used more. One way to set the proportion of usage of mediation devices in inverse relation to the communication load on mediation devices is to use the following equation:

EQU. 1:
$$p_i = \frac{1/C.L._j}{\sum_{k=1}^{N} 1/C.L._k}$$

where, Pi is a proportion of messages sent using an ith mediation device that is within range of a particular regular device having messages to send; C.L.j is a quantification of a communication load on a jth device; and the summation is taken over N mediation devices that are within range of the particular regular device having messages to send.

In equation one, the quantification of communication load C.L.j can be based on a single parameter such as queue length, average queue length, average acknowledgement time, or the number of devices with which a mediation device communicates. Alternatively, the quantity C.L j can be a value that combines (e.g. in a weighted sum or other mathematical formula) multiple parameters that are indicative of communication load.

In block 908, the messages (or parts of a multipart message) that were read in block 904 are transmitted using mediation devices in the proportions determined in block 906. In sending messages according to the proportions determined block 908, a round robin method is suitably used. In a round robin method, for each successive group of a number M of messages (or parts of a multipart message), the number M is suitably multiplied by the proportion determined for each mediation device determined in block 908, and the result rounded to an integer number to obtain a number out of the M messages (or parts of multipart messages) that is to be sent using each mediation device. Each mediation device is then used to send the computed number of messages. In case the communication loads on the mediation devices happens to vary substantially, and updated information on the communication loads is received, it is prudent to use mediation devices in order according to their communication loads, starting with the mediation device with the lightest communication load.

Figure 10:
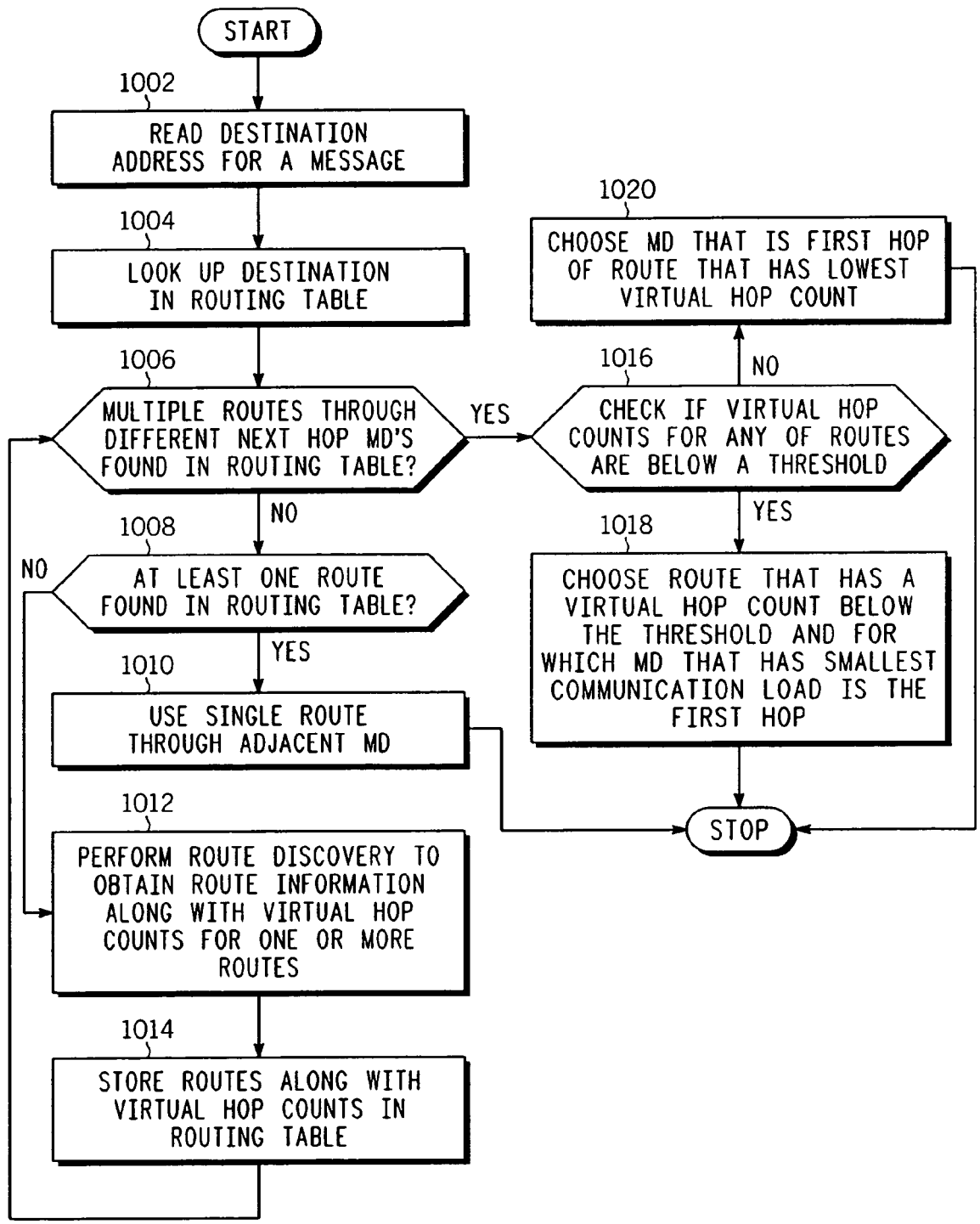
FIG. 10 is a flowchart showing operations performed by a regular device in the network shown in FIG. 2 in selecting a mediation device to use based on mediation device communication load and routing considerations.

FIG. 10 is a flowchart showing operations performed by a regular device in the network 200 shown in FIG. 2 in selecting a mediation device to use based on mediation device communication load and routing considerations. In block 1002 a destination address for a message that is to be sent is read. The message comprises one or more parts. In block 1004, the destination address is looked up in a routing table maintained by the regular device. The routing table is suitably constructed by any of a variety of methods including the well know techniques of Dynamic Source Routing, Ad-hoc On-demand Distance Vector (AODV), Destination-Sequenced Distance Vector Routing (DSDV), or any other ad hoc wireless routing protocol that stores a routing table for nodes storing device addresses and other routing cost constraint information. For use in connection with this embodiment, such routing techniques are modified so that more than one route to each destination is maintained in the routing table. In particular, if there exist multiple routes for a given destination that have different mediation devices as a next hop from the regular device executing the flowchart in FIG. 10, such routes are retained in the routing table. Block 1006 is a decision block, the outcome of which depends on whether multiple routes through different next hop mediation devices are found in the routing table. If the outcome of decision block 1006 is negative the flowchart branches to decision block 1008, the outcome of which depends on whether at least one route is found in the routing table. If a single route to the destination is found, then the flowchart branches to block 1010 in which the single route is used to send the message.

If on the other hand, it is determined in decision block 1008 that there is no route to the destination in the routing table, then in block 1012 a route discovery process is performed to obtain route information along with virtual hop counts for one or more routes. As used herein, the term virtual hop count encompasses metrics of properties of a route that directly or indirectly relate to how quickly use of the route will lead to battery exhaustion. Such metrics are based on quantities that apply to each link and/or to each node along a route. The quantities are suitably summed, multiplied or combined with a minimum (MIN) or maximum (MAX) mathematical operator in mathematical expressions of the virtual hop count metrics.

Examples of quantities on which virtual hop count metrics are suitably based include battery energy (indicated by voltage) remaining in nodes along a route, transmit power for links along a route (which relates to battery energy consumption), packet loss rates for links along a route (which relates to the required retransmissions and thereby to battery consumption), received signal strength indication (RSSI) and signal to noise ration (SNR) (which are predictors of retransmission rates, and thus battery consumption) for links along the route. Each node in the network 200 is programmed to evaluate the quantities for itself and for one or more links of which it is an end point. The quantities are suitably collected in route discovery packets in the form of a single quantity which is to become the virtual hop count metric, or in a list of quantities. The quantities can appear in linear and nonlinear expressions of the virtual hop count metrics. As the route discovery packet propagates along potential routes, at each node that the route discovery packet crosses, the quantities for the node and/or adjacent link are added to the list or incorporated into the single quantity, which is to become the virtual hop count. This single quantity virtual hop count is updated by adding a term, multiplying in another factor, revaluating a MIN or MAX function, or reevaluating another type of mathematical function. In the case of AODV routing, the route reply messages can be used to collect quantities that determine the virtual hop count metric. Quantities collected in the route reply messages would take the place or supplement the hop count field typically included in such messages. In block 1014, the virtual hop counts are suitably stored in the routing table in association with routes to which they apply.

After route discovery has been performed in block 1012 and the resulting routes stored in the routing table in block 1014, the flowchart returns to decision block 1006 previously described. If upon executing block 1006, whether it is reached from block 1004, or block 1014, it is determined that multiple routes through different next hop mediation devices to the destination exist, then the flowchart branches to block 1016. Block 1016 is a decision block the outcome of which depends on whether the virtual hop counts for any of the routes to the destination are below a predetermined threshold which would tend to indicate that the destination is nearby. The value of the predetermined threshold is suitably set based on real or simulated experimentation in which multiple values of the predetermined threshold are evaluated with respect to their effect on battery exhaustion in the network 200. If it is determined that any of the virtual hop counts are below the predetermined threshold, then the flowchart branches to block 1018.

In block 1018 a route is chosen from among those routes that have virtual hop counts below the threshold, based on the communication loads on the mediation devices that are involved in the first hop along each of the multiple routes to the destination. In particular, the regular device chooses the route that has the lowest communication load on the mediation device that is involved in the first hop.

If on the other hand, it is determined in block 1016 that none of the multiple routes to the destination have virtual hop counts below the threshold, then the flowchart branches to block 1020 in which the route (and the MD involved in the first hop of the route) is chosen based on the virtual hop count along the route. In particular, the route, which has the lowest virtual hop count is chosen. It will be appreciated by those skilled in the art that a simple change in the expression of the virtual hop count metric (e.g., inversion or subtraction from 1) would alter the virtual hop count metric such that it would be appropriate to choose a maximum virtual hop count metric as opposed to a minimum virtual hop count metric.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of operating a wireless device to send data in a network that includes mediation devices, operating at a higher duty cycle than the wireless device, that are used to facilitate communication, the method comprising:
   attempting to receive communications from a plurality of mediation devices; and
   for each particular mediation device among the plurality of mediation devices:
      receiving one or more parameters indicating a communication load carried by the particular mediation device;
      comparing the one or more parameters to one or more predetermined limits; and
      if one or more of the predetermined limits is exceeded for the particular mediation device, eliminating the particular mediation device from consideration for use in sending data.

2. The method according to claim 1 further comprising:
sending data using one or more of the mediation devices that have not been eliminated from consideration.

3. The method according to claim 2 wherein sending data using one or more of the mediation devices that have not been eliminated comprises:
proportioning use of mediation devices that have not been eliminated from consideration for use in sending data, wherein each mediation device is used for a share of transmissions that is inversely related to the communication load carried by the particular mediation device as indicated by the one or more parameters.

4. The method according to claim 2 further comprising:
using each particular mediation device of the plurality of mediation devices that have not been eliminated for an amount of data that is proportional to an inverse of a quantification of communication load for the particular mediation device normalized by dividing by a sum of the inverse of the quantification of communication load summed over the plurality of mediation devices.

5. The method according to claim 4 wherein:
the quantification of communication load is one of the one or more parameters indicating the communication load.

6. The method according to claim 4 wherein:
the quantification of communication load is based on a mathematical expression that combines a plurality of the one or more parameters indicating the communication load.

7. The method according to claim 4 wherein:
the quantification of communication load is selected from the group consisting of queue size and running average queue size.

8. The method according to claim 1 wherein:
if the attempting to receive communications from a plurality of mediation devices results in receiving communications from only a first mediation device, transmitting data through the first mediation device.

9. The method according to claim 1 wherein:
if the attempting to receive communications from a plurality of mediation devices results in receiving no communications from any mediation device, commencing to operate as a mediation device.

10. The method according to claim 1 wherein:
if the attempting to receive communications from a plurality of mediation devices results in receiving no communications from any of the plurality of mediation devices, commencing to operate in a mode that is not enabled by mediation devices.

11. A method of operating a wireless device to send data in a network that includes mediation devices, operating at a higher duty cycle than the wireless device, that are used to facilitate communication, the method comprising:
detecting more than one of a plurality of mediation devices;
for each particular mediation device among the plurality of mediation devices that are detected, receiving one or more parameters indicating a communication load carried by the particular mediation device; and
scheduling transmission with at least one of the mediation devices that are detected according to the one or more parameters by distributing transmissions among the more than one of the plurality of mediation devices, wherein each particular mediation device of the more than one of the plurality of mediation devices that are detected is used for an amount of transmissions that is inversely related to the communication load carried by the particular mediation device as indicated by the one or more parameters.

12. The method according to claim 11 wherein:
distributing transmissions among the more than one of the plurality of mediation devices that are detected comprises:
scheduling each particular mediation device of the more than one of the plurality of mediation devices to be used for an amount of communication that is proportional to an inverse of a quantification of communication load for the particular mediation device normalized by dividing by a sum of the inverse of the quantification of communication load summed over the more than one of the plurality of mediation devices.

13. The method according to claim 12 wherein the quantification of communication load comprises a parameter selected from the group consisting of an indicator of queue size and an indicator of running average queue size.

14. The method according to claim 11 wherein:
in case only a first of the plurality of mediation devices is detected
transmitting data through the first mediation device.

15. The method according to claim 11 wherein:
in case none of the plurality of mediation devices is detected, commencing to operate as a mediation device.

16. A method of operating a wireless device to send data in a network that includes mediation devices, operating at a higher duty cycle than the wireless device, that are used to facilitate communication, the method comprising:
detecting a plurality of mediation devices;
for each particular mediation device among the plurality of mediation devices: receiving one or more parameters indicating a communication load carried by the particular mediation device;
performing route discovery wherein virtual hop counts are determined that are indicative of how quickly one or more batteries will be exhausted, in one or more nodes, in one or more routes involving at least one of the plurality of mediation devices; and
scheduling transmission with at least one of the plurality of mediation devices based on the one or more parameters, and the virtual hop counts for routes through at least a subset of the plurality of mediation devices.

17. The method according to claim 16 wherein scheduling transmissions comprises:
comparing the virtual hop count for each of the one or more routes to a threshold;
in case the virtual hop count for any of the one or more routes is below the threshold, choosing a route that involves one of the plurality of mediation devices that has a lowest communication load as indicated in the one or more parameters; and
in case the virtual hop count for any of the one or more routes is not below the threshold, choosing a mediation device that is associated with a route that has an extremum virtual hop count.

18. A wireless device for use in a wireless network that comprises mediation devices, operating at a higher duty cycle than the wireless device, for use in communication, the wireless device comprising:
a transceiver comprising a receiver and a transmitter;
a program memory for storing a control program;
a controller coupled to the transceiver for exchanging digital signals and data with the controller, said controller being further coupled to the program memory for receiving program instructions of the control program;

wherein the control program configures the wireless device to:
  detect a plurality of mediation devices; and
  for each particular mediation device among the plurality of mediation devices:
    receive one or more parameters indicating a communication load carried by the particular mediation device; and
    schedule transmission through at least one of the plurality of mediation devices according to the one or more parameters by distributing transmissions among the more than one of the plurality of mediation devices, wherein each particular mediation device of the more than one of the plurality of mediation devices that are detected is used for an amount of transmissions that is inversely related to the communication load carried by the particular mediation device as indicated by the one or more parameters.

19. A wireless system comprising:
a first plurality of wireless devices configured for low duty cycle operation;
a second plurality of wireless devices configured to operate at a higher duty cycle than the first plurality of wireless devices and also configured to serve as mediation devices that support low duty cycle operation by the first plurality of wireless devices;
wherein each of the first plurality of wireless devices is configured to:
  receive one or more parameters that are indicative of a communication load from each of a subset of the second plurality of wireless devices; and
  choose one or more of the subset, to be used in communicating based, at least in part on, the one or more parameters, wherein each of the second plurality of wireless devices of the subset is used for an amount of transmissions that is inversely related to the communication load carried by the each of the second plurality of wireless devices of the subset as indicated by the one or more parameters.

20. The wireless system according to claim 19, wherein, in choosing one or more of the subset, the first plurality of devices are configured to compare the one or more parameters to one or more limit values, and eliminate from consideration wireless devices for which the limit values are violated.

21. The wireless system according to claim 19 wherein, in receiving one or more parameters, each of the first plurality of wireless devices receives a parameter related to queue length from each of the subset of the second plurality of devices.

22. A wireless device for operating in a wireless network that comprises mediation devices operating at a higher duty cycle than the wireless device, the wireless device comprising:
  a means for detecting a plurality of mediation devices; and
  for each particular mediation device among the plurality of mediation devices that are detected:
    a means for receiving one or more parameters indicating a communication load carried by the particular mediation devices; and
    a means for scheduling transmission through at least one of the detected mediation devices based, at least in part, on the one or more parameters by distributing transmissions among the at least one of the detected of mediation devices, wherein each at least one of the detected mediation devices is used for an amount of transmissions that is inversely related to the communication load carried by the at least one of the detected mediation device as indicated by the one or more parameters.

23. A wireless device for operating in a network that includes mediation devices, operating at a higher duty cycle than the wireless device, that are used for communication, the wireless device comprising:
  a means for detecting a plurality of mediation devices;
  a means for receiving one or more parameters indicating a communication load carried by each of the plurality of mediation devices;
  a means for comparing the one or more parameters to one or more predetermined limits; and
  a means for eliminating a particular mediation device from consideration for use if one or more of the predetermined limits is exceeded for the particular mediation device.

* * * * *